March 31, 1970     F. J. JIRIK     3,503,266
GRAIN SAMPLER DEVICE
Filed Oct. 26, 1967
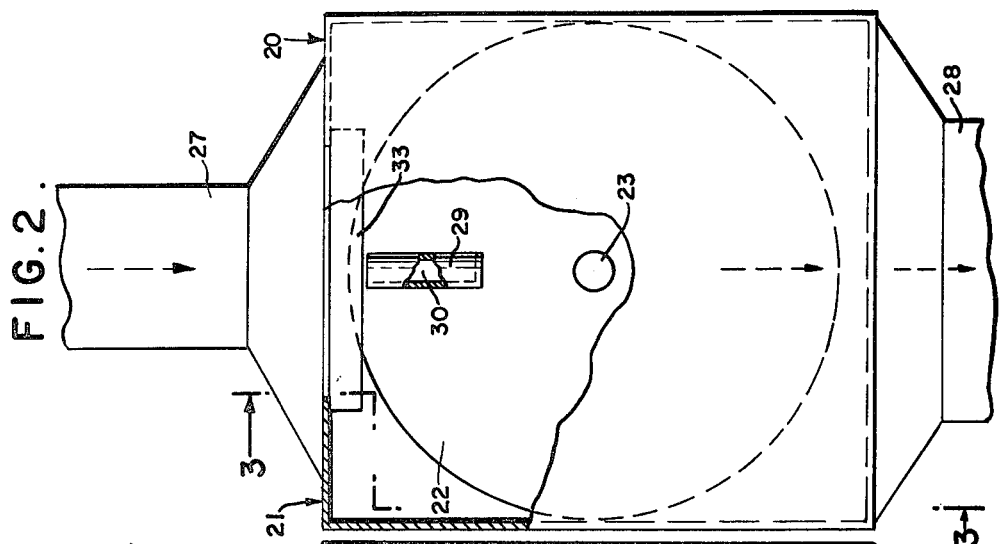
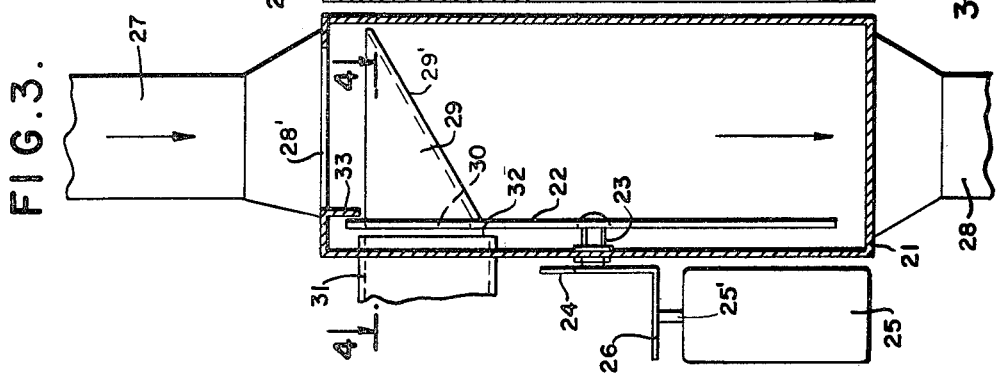
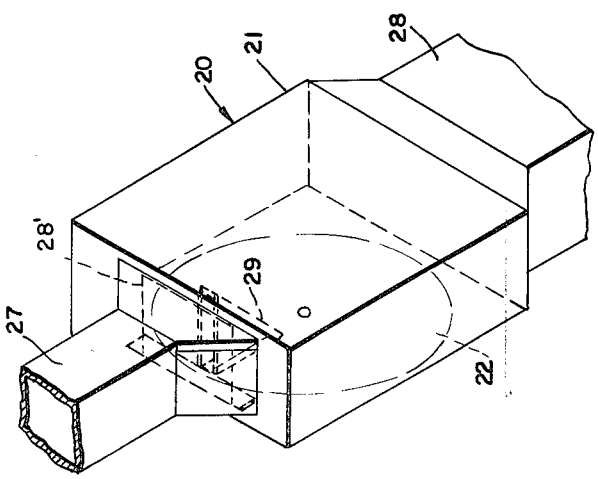
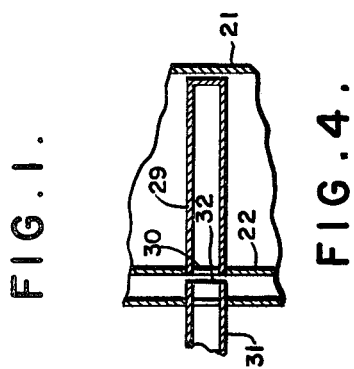
INVENTOR
Frank J. Jirik
BY *Robert E. Kleve*
ATTORNEY

United States Patent Office 3,503,266
Patented Mar. 31, 1970

3,503,266
GRAIN SAMPLER DEVICE
Frank J. Jirik, Rte. 2, Fisher, Minn. 48202
Filed Oct. 26, 1967, Ser. No. 678,413
Int. Cl. G01n 1/02
U.S. Cl. 73—424                                    2 Claims

ABSTRACT OF THE DISCLOSURE

A grain sampler has a vertical input chute, a housing beneath the input chute, an output chute beneath the housing and a disc mounted within the housing and spaced from the wall of the housing. A funnel is mounted on the face of the disc with an open end projecting radially outward from the horizontal axis of the disc and another open end directed toward the face of the disc. The disc has an aperture in its face to connect with the open end of the funnel. A conduit projects into the housing with its face adjacent the disc surface. When grain falls into the housing the funnel will deflect a sample through the aperture and into the conduit as the aperture and conduit face are aligned. The alignment takes place only once for each complete revolution of the disc.

---

This invention relates to samplers, more particularly the invention relates to grain samplers.

It is an object of the invention to provide a novel inexpensive sampler which can subdivide the grain passing through a conduit at regular intervals and divert the subdivided grain to an inspection station for examination.

It is a further object of the invention to provide a novel subdivider for subdividing a steram of grain for sampling which can be easily manufactured and operated.

It is a further object of the invention to provide a novel inexpensive sampler or subdivider which operates in a positive manner to sample commodities in regular intervals.

Further objects and advantages of the invention will become apparent as the description proceeds and when taken in conjunction with the accompanying drawing wherein:

FIGURE 1 is a perspective view of the grain sampler invention.

FIGURE 2 is a top-plan view of the grain sampler invention with portions broken away to reveal the invention thereof.

FIGURE 3 is a cross-sectional view taken along line 3—3 of FIGURE 2.

FIGURE 4 is a cross-sectional view taken along line 4—4 of FIGURE 3.

Briefly stated the invention comprises a grain sampler having a rectangular housing with an inlet and an outlet opening, a rotary disc mounted in the housing and powered by an electric motor, said disc having an upright narrow spout mounted along one edge and an opening through the bottom of the disc communicating with the spout, said disc being adapted to rotate and pass said spout in front of said inlet opening for said spout to receive a portion of the grain for sampling being introduced into the housing through the inlet opening as said spout passes in front of the inlet opening when said disc rotates.

Referring more particularly to the drawing, in FIGURE 1, the grain sampler invention 20 is illustrated having a rectangular housing 21 with a rotary disc member 22 mounted on a shaft 23. The shaft 23 is rotatably mounted to the housing 21. A gear 24 is fixed to the shaft 23 at the bottom of the housing. A motor 25 is fixed to the bottom of the housing and a gear 26 is fixed to the outer end of the shaft 25' of the motor 25. The motor when turned on rotates the motor shaft 25' which rotates gear 26 and gear 26 drives the gear 24 and the rotation of gear 24 in turn rotates the disc 22.

The grain sampler housing 21 has an inlet conduit 27 and an outlet conduit 28 for the grain to be sampled to pass through.

The grain is introduced through the inlet conduit 27 through the opening 28' in the housing 21 and into the triangle spout 29 mounted to the edge of the disc member 22. The triangle spout communicates with a rectangular opening 30 in the bottom of the disc member 22.

Beside the disc member 22 is a rectangular tube 31 having a rectangular opening 32 at its end which communicates with the rectangular opening 30 in the disc member 22 when the spout 29 is directly in front of the opening 28' in the housing communicating with the inlet conduit 27.

OPERATION

The grain sampler invention 20 operates as follows: the rotary disc member 22 rotates counterclockwise when viewed from FIGURE 2, driven by the motor 25. The rotation of the disc 22 rotates the spout 29 past the opening 28' in the housing at regular intervals.

The grain for sampling passes into the inlet conduit 27 and through the opening 28'. A strap or curtain 33 which may be made of flexible material extends out from the bottom of the opening 28' and covers the outer end of the disc member 22 to direct the grain onto the disc member 22 where it will pass across the disc member 22 and out the outlet opening 28 at the opposite end of the housing 21.

Each time the spout 29 passes in front of the opening 28' it will receive a sample of the grain coming in the inlet conduit 27. The grain received in the spout 29 will be deflected by the tapered back wall 29' laterally through the rectangular opening 30 in the disc 22 where it will travel into the chute 31 through the open end 32 of the chute. The grain deposited in the chute 31 may be inspected for grading and other evaluation.

Thus it will be seen that a novel positive grain sampler has been provided which will rotate a spout through the stream of grain travel and the grain received in the spout will be deflected out of the stream of grain travel, for sampling inspection and evaluation.

It is intended that in ordinary operation the sampling invention will preferably be mounted with the housing 21 upright so that the rotational axis of the shaft 23 will extend along horizontal plane and thus the conduits 27 and 28 will be directed vertically with the conduit 27 above conduit 28 so that the grain will granulate downward through the conduit 27 into the sample housing 21 and downward into the conduit 28 with the rotating disc and spout removing a sample from the grain at regular intervals.

It will be obvious that various changes and departures may be made in the invention without departing from the spirit and scope thereof and accordingly it is not intended that the invention be limited to that specifically described in the specification or as illustrated in the drawing.

What is claimed is:

1. A grain sampler comprising a vertical input chute, a housing mounted beneath said input chute, an output chute beneath said housing, a vertical disc member mounted within said housing and at the side of said input chute and spaced from the wall of said housing, said vertical disc member being adapted to rotate about a horizontal axis, a funnel mounted to the face of said disc and having an open end projecting radially outward from the horizontal axis of the disc and another open end directed toward the face of the disc, said disc having an aperture in its face in communication with said other open end of said funnel, a conduit laterally adjacent said housing and in communication with said housing and said aperture in its face in communication with said other open housing with its face adjacent the disc surface, whereby grain may be introduced into said vertical chute and will fall by gravity into said housing and out said output chute, with said rotary disc rotating said funnel through the stream of grain and deflecting a sample of grain into said one open end of said funnel and out said other open end of said funnel and the sample stream through said aperture in said disc being deflected into said conduit when said aperture and conduit face are aligned, said conduit being in communication with said aperture in said rotating disc only once for each complete revolution of said disc.

2. A grain sampler comprising a vertical input chute, a housing mounted beneath said input chute, an output chute beneath said housing, a vertical disc member mounted within said housing and at the side of said input chute and spaced from the wall of said housing, said vertical disc member being adapted to rotate about a horizontal axis, a funnel mounted to the face of the disc and having an open end projecting radially outward from the horizontal axis of said disc and another open end directed toward the face of the disc, said disc having an aperture in its face in communication with said other open end of said funnel, a conduit laterally adjacent said housing and in communication with said housing and said aperture in said disc and having a size approximately the size of the aperture in said disc, whereby grain may be introduced into said vertical chute and will fall by gravity into said housing and out said output chute, with said rotary disc rotating said funnel through the stream of grain and deflecting a sample of grain into said one open end of said funnel and out said other open end of said funnel and the sample stream through said aperture in said disc being deflected into said conduit when said aperture and conduit face are aligned, said conduit being in communication with said aperture in said rotating disc only once for each complete revolution of said disc.

References Cited

UNITED STATES PATENTS

| | | | |
|---|---|---|---|
| 563,101 | 6/1896 | Topham | 73—424 |
| 3,298,235 | 1/1967 | Platzer et al. | 73—422 |

LOUIS R. PRINCE, Primary Examiner

HARRY C. POST III, Assistant Examiner